June 1, 1965  E. F. BEEZER  3,186,775
SLIDE
Filed May 29, 1962

INVENTOR.
EARL F. BEEZER

BY McGlew and Toren
ATTORNEYS 3,186,775
SLIDE
Earl F. Beezer, 77 Hemlock Drive, Paramus, N.J.
Filed May 29, 1962, Ser. No. 198,497
3 Claims. (Cl. 308—6)

This invention relates in general to a slide for movable parts, and in particular to a new and useful slide construction including a housing having a plurality of small ball bearings for the linear guidance of a slide rod with the rod in rolling contact with the bearings, and including adjustable roller means engageable with a flat or grooved portion of the rod for controlling angular rotation of the rod.

Slides of present day construction have parts which are in sliding contact with one another. Such parts may, for example, be dove-tailed, square, rectangular, round, or other shapes with the members held in sliding engagement resulting in wear, friction and the possibility of binding and misalignment. In some instances, slides are made which include bearings for rolling contact between the relatively movable elements. However, with such slide constructions, great difficulty is encountered with slide devices in ensuring accurate and uniform positioning and holding of a member in the slide while the rotation of the member is controlled or prevented. In most instances, bearings become worn after a short period of use and misalignment and play result, which are undesirable. Correction of any misalignment usually can be made only by complete replacement of the roller bearings which support and linearly guide the movable member.

In accordance with the present invention, there is provided a slide construction which includes a housing having means for supporting a plurality of linear ball bearings for axially or linearly guiding a movable member therein. A feature of the construction is the provision of adjustable roller means which is engageable with the rod on a flattened or grooved surface thereof for controlling or preventing the rotation thereof and also for permitting the adjustment and alignment of the rod. In this manner, it is possible to pre-load the rod to ensure that the movement thereof is without play and thus to minimize wear which may result and to correct for any minor wear variations.

The invention provides simple, adjustable means for preventing angular rotation of a ball bearing mounted slide member by permitting adjustment for any wear conditions that may result or for effecting adjustment for zero shake or pre-load. The slide advantageously includes a rod member which may be shaped in a variety of manners, such as rectangular or square-shaped, for example, and provided with means for effecting easy connection thereof to a movable machine element, for example. In some instances, the ends are flattened to permit mounting of tools, actuating means or other devices.

Accordingly, it is an object of this invention to provide an improved slide construction.

A further object of the invention is to provide a slide including means supporting a plurality of linear ball bearings and a rod member centrally mounted in said bearings for linear displacement, and means engageable with the rod member for limiting angular rotation thereof, while permitting easy linear displacement.

A further object of the invention is to provide a slide construction including a housing having a plurality of axially spaced linear ball bearings mounted therein, a rod member centrally mounted in the bearings and axially displaceable in rolling contact therewith, and a roller in contact with a grooved or flattened surface of the rod to limit the rotation thereof, the roller being adjustable to permit pre-loading and accurate positioning of the rod.

A further object of the invention is to provide a slide mechanism which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
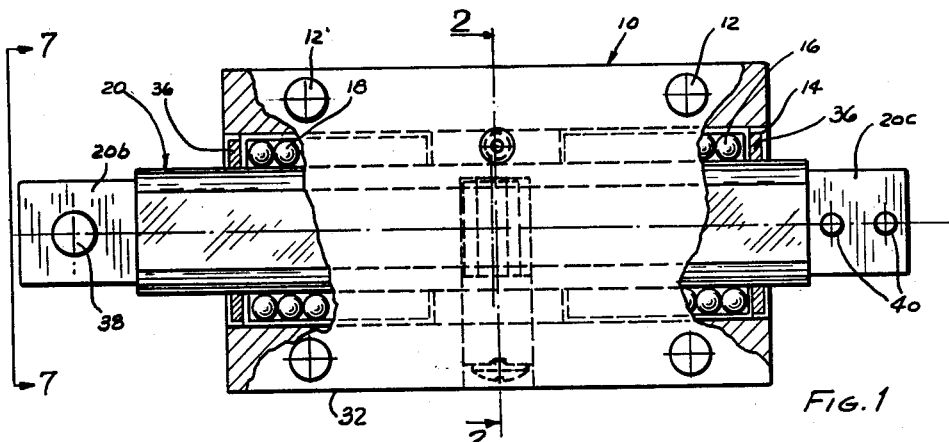
FIG. 1 is a partial top plan view in transverse section of a slide constructed in accordance with the invention.
Figures 3, 4, 5, 6:
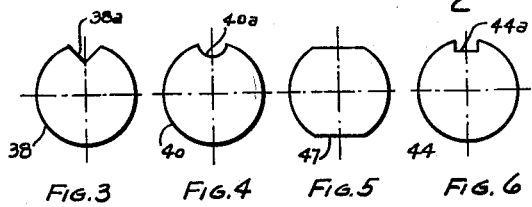
FIGS. 3 to 6 are cross-sections of different embodiments of rod member.
Figure 2:
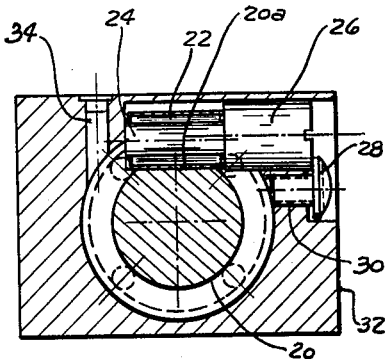
FIG. 2 is a section taken along the line 2—2 of FIG. 1.

Referring to the drawings in particular, the invention indicated in FIGS. 1 and 2 includes a block-shaped housing generally designated 10 which is advantageously made of a single block member provided with mounting holes 12. The housing 10 is provided with a central bore 14 in which is accommodated a plurality of bushings having linear ball bearings such as bushings 16 and 18 at each end.

In accordance with the invention, a linearly displaceable rod member or machine element generally designated 20 is positioned within the housing 10 in rolling contact with the linear ball bearings of the sets 16 and 18. In the preferred arrangement, the linear ball bearing sets 16 and 18 are preferably axially spaced and arranged at opposite ends of the housing 10.

Each bearing set 16 and 18 is of well known construction including a plurality of race systems arranged around the interior periphery and with the effective or active balls all oriented in a straight line direction, i.e., an axial direction, for facilitating rolling movement only in axial back and forth directions.

In the embodiment of FIGS. 1 and 2, the member 20 is a rod element which has a flattened top surface 20a at least in a central portion thereof which is engageable by a needle roller 22 which is rotated on a stud or an eccentric pin 24 which is eccentrically carried at one end of a cylindrical adjustment cylinder 26. The cylinder 26 may be rotated to adjust the positioning of the roller 22 in relation to the flattened portion 20a of the rod 20. For example, "zero-shake" holding of the rod 20 in relation to the supporting roller bearing sets 16 and 18 may be achieved, or the rod 20 may be pre-loaded in a selected direction. The roller 22 permits free lateral or axial movement of the rod 20 and also ensures against the angular rotation thereof during such movement. With such a provision, it is possible to ensure that the rod always lies in a uniform manner on the bearing sets 16 and 18 and adjustment can be made for any wear which may occur.

After the cylinder 26 is rotated to accurately position the roller 22 on the flattened surface 20a, the cylinder is secured in the adjusted position by means of a screw 28 which is threaded into a tapped hole 30 defined in a side wall 32 of the housing 10. The head of the screw 28 bears against the end of the cylinder 26 to ensure that it will not be angularly displaced after roller 22 is set.

The housing advantageously includes a lubricating passage 34 to permit lubrication of the operating parts. The ends of the housing are advantageously provided with seals 36 to ensure that the interior of the housing and the parts in rolling contact are maintained dust-free and that the lubricant will be retained.

A feature of the construction is that the movable member 20 may advantageously include flattened ends 20b and 20c for the mounting of machine elements thereon which may be advantageously secured through bolt openings 38 and 40.

In the arrangement indicated in FIGS. 1 and 2, the roller 22 is advantageously carried at the upper portion of the housing and it may be adjustably positioned to cause the rod member 20 to bear against load carrying balls in the linear ball bearing sets 16 and 18, regardless of the number of such ball sets or balls employed. The flattened portion 20a of the rod 20 is advantageously located to permit easy linear displacement thereof. In some instances, it is desirable to locate the roller 22 at a location so that pre-loading may be effected.

For some purposes, more than one roller is used. In the embodiment illustrated in FIGS. 1 and 2, an eccentrically mounted roller is shown, the eccentricity being provided for adjustment purposes, but it should be appreciated that any means for adjustably mounting this roller may be employed.

Thus, in the preferred arrangement, the moving elements are guided by anti-friction or rolling contact. The movable elements are preferably made of hardened material and ground for long wear and adjustment is preferably made for operation with zero-shake conditions. The entire housing 10 is sealed so that lubricant is retained and the interior is maintained free of dust and foreign matter.

In FIGS. 3 to 6, rod elements 39, 41, 47 and 44 are indicated. The rod element 39 is provided with a V-shaped groove 39a to accommodate, for example, a smaller sized roller adjusting member which will ride in this groove.

Further modifications include the semi-circular groove 41a of the rod element 41, the double flats on the rod element 47 and the rectangular groove 44a of the rod element 44.

Figure 7:
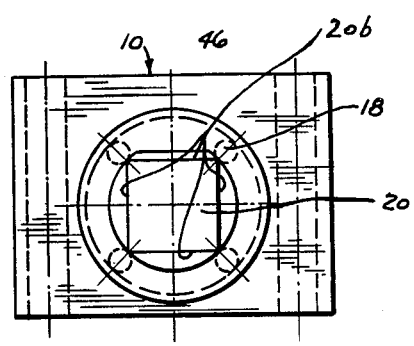
FIG. 7 is an end elevation of the slide.

As indicated in FIG. 7, the outer ends of the rod 20 are provided with beveled top corners 20b and are made substantially square.

Thus, the invention provides a simple slide element which is made of a minimum of parts and ensures the accurate holding of a movable rod element or other machine part with a minimum of friction hindering such movement. The arrangement is such that adjustment may be made to pre-load the movable element in a selected direction and ensure against its angular rotation while permitting unhindered linear displacement. The parts are maintained in a closed housing free from dust or dirt and any wear may be compensated for by simple adjustment means.

While specific embodiments of the invention have been shown and described in detail to illustrate the application of the inventive principles, it will be understood that the invention may be embodied otherwise without departing from such principles.

What is claimed is:

1. A slide comprising a housing having a bore, a linear ball bearing bushing arranged in said bore at each end of said housing, each bushing having ball bearings arranged in an axial direction at circumferentially spaced locations for facilitating axial rolling movement, a rod member supported on said ball bearings within said housing and being movable in axial directions in rolling contact with said ball bearings, said rod member having a portion forming a surface for limiting angular movement, and a roller mounted in said housing for rotation about an axis substantially perpendicular to the direction of movement of said rod member and being in engagement with the formed surface of said rod member and limiting angular rotation of said rod member but permitting free linear movement thereof, said roller member being supported centrally in said housing between said ball bearing bushings, a cylinder rotatable in said housing and eccentrically carrying said roller, said cylinder being rotatable to adjust the position of said roller toward and away from said rod member.

2. A slide according to claim 1, wherein said housing includes a central opening extending inwardly to said cylinder for exposing said cylinder for adjustment purposes, and a threaded member threaded into said housing and engaging the end of the cylinder for locking said cylinder in an adjusted position.

3. A slide comprising a housing having a bore, a linear ball bearing bushing arranged in said bore at each end of said housing, each bushing having a plurality of circumferentially spaced rows of freely rotatable ball bearings, each row extending in an axial direction for facilitating axial rolling movement, a cylindrical rod member rotatably supported on said ball bearings within said housing and being movable in an axial and rotational direction in rolling contact with said ball bearings, said rod member having a portion forming a surface for limiting rotational movement, and a roller member centrally mounted in said housing for rotation about an axis substantially perpendicular to the axis of said rod and engaging said rod on the surface formed for limiting angular movement thereon, said roller member being wide enough to constrain said rod against rotational movement and being freely rollable to permit free linear movement of said rod upon rotation of said roller.

References Cited by the Examiner
UNITED STATES PATENTS

| | | |
|---|---|---|
| 2,353,088 | 7/44 | Schutz. |
| 2,595,482 | 5/52 | Palumbo. |
| 2,628,135 | 2/53 | Magee. |
| 2,776,173 | 1/57 | Rudy _____ 308—5 |
| 2,994,567 | 8/61 | Liebmann _____ 308—5 |
| 2,997,346 | 8/61 | Beninger et al. |
| 3,014,382 | 12/61 | Watson. |

ROBERT C. RIORDON, *Primary Examiner.*